United States Patent
Degertekin et al.

(10) Patent No.: US 7,485,847 B2
(45) Date of Patent: Feb. 3, 2009

(54) DISPLACEMENT SENSOR EMPLOYING DISCRETE LIGHT PULSE DETECTION

(75) Inventors: Fahrettin Levent Degertekin, Decatur, GA (US); Wook Lee, Atlanta, GA (US); Neal Allen Hall, Albuquerque, NM (US)

(73) Assignee: Georgia Tech Research Corporation, Atlanta, GA (US)

(*) Notice: Subject to any disclaimer, the term of this patent is extended or adjusted under 35 U.S.C. 154(b) by 191 days.

(21) Appl. No.: 11/297,097

(22) Filed: Dec. 8, 2005

(65) Prior Publication Data

US 2006/0227845 A1 Oct. 12, 2006

Related U.S. Application Data

(60) Provisional application No. 60/634,324, filed on Dec. 8, 2004.

(51) Int. Cl.
*G01D 5/36* (2006.01)
*G02B 27/42* (2006.01)
*G02B 5/18* (2006.01)
*G01J 1/32* (2006.01)
*G01B 11/02* (2006.01)

(52) U.S. Cl. .............. 250/237 G; 250/550; 250/205; 356/499; 359/572

(58) Field of Classification Search .......... 250/205, 250/237 R, 237 G, 550; 356/305, 477, 485–487, 356/505, 902, 308, 499, 521, 622; 359/318, 359/337.21, 337.22, 572
See application file for complete search history.

(56) References Cited

U.S. PATENT DOCUMENTS

| | | | |
|---|---|---|---|
| 4,188,124 A | 2/1980 | Jaerisch et al. | 356/356 |
| 5,047,633 A | 9/1991 | Finlan et al. | 250/306 |
| 5,247,186 A | 9/1993 | Toda | 250/561 |

(Continued)

FOREIGN PATENT DOCUMENTS

JP 05248810 9/1992

(Continued)

OTHER PUBLICATIONS

Zygo Corporation, "Zygo Corporation's New View 5000™; Precise, Rapid, Noncontact 3D Surface Profiling," Apr. 2001.

(Continued)

*Primary Examiner*—Kevin Pyo
*Assistant Examiner*—Don Williams
(74) *Attorney, Agent, or Firm*—Bryan W. Bockhop; Bockhop & Associates, LLC

(57) ABSTRACT

Optical sensors, and methods for operating optical sensors, are disclosed. One such sensor may include: a reflector positioned a distance from a reflective diffraction grating and a light source for providing light. A first portion of the light can be reflected from the reflective diffraction grating and a second portion of the light passes through the grating to the reflector and is reflected back through the diffraction grating. The sensor may further include a detector for sensing an intensity of light in an interference pattern formed by the first portion of the light reflected from the diffraction grating and the second portion of the light reflected from the reflector. The sensor includes a controller configured to modulate an emission of the light.

10 Claims, 8 Drawing Sheets

U.S. PATENT DOCUMENTS

| | | | |
|---|---|---|---|
| 5,253,515 A | 10/1993 | Toda et al. | 73/105 |
| 5,402,234 A | 3/1995 | Deck | 356/497 |
| 5,412,980 A | 5/1995 | Eilings et al. | 73/105 |
| 5,445,011 A | 8/1995 | Ghislain et al. | 73/105 |
| 5,517,280 A | 5/1996 | Quate | 355/71 |
| 5,526,116 A | 6/1996 | de Groot | 356/354 |
| 5,565,987 A | 10/1996 | Jain et al. | 356/352 |
| 5,900,729 A | 5/1999 | Moser et al. | 324/244 |
| 5,908,981 A | 6/1999 | Atalar et al. | 73/105 |
| 5,908,987 A | 6/1999 | Raj | 73/514.09 |
| 5,923,033 A | 7/1999 | Takayama et al. | 250/234 |
| 5,952,657 A | 9/1999 | Alexander et al. | 250/306 |
| 6,028,305 A | 2/2000 | Minne et al. | 250/234 |
| 6,038,057 A | 3/2000 | Brazas et al. | 359/291 |
| 6,127,767 A | 10/2000 | Lee et al. | 310/309 |
| 6,157,114 A | 12/2000 | Binning et al. | 310/321 |
| 6,181,097 B1 | 1/2001 | Li et al. | 318/592 |
| 6,196,061 B1 | 3/2001 | Adderton et al. | 73/105 |
| 6,247,747 B1 | 6/2001 | Kawanomoto et al. | 296/191 |
| 6,251,755 B1 | 6/2001 | Furukawa et al. | 438/755 |
| 6,272,907 B1 | 8/2001 | Neukermans et al. | 73/105 |
| 6,279,389 B1 | 8/2001 | Adderton et al. | 73/105 |
| 6,291,927 B1 | 9/2001 | Percin et al. | 310/324 |
| 6,341,526 B1 | 1/2002 | Castracane et al. | 73/705 |
| 6,389,899 B1 | 5/2002 | Partridge et al. | 73/514.33 |
| 6,400,166 B2 | 6/2002 | Babson et al. | 324/754 |
| 6,445,109 B2 | 9/2002 | Percin et al. | 310/324 |
| 6,523,392 B2 | 2/2003 | Porter et al. | 73/24.01 |
| 6,567,572 B2 * | 5/2003 | Degertekin et al. | 385/12 |
| 6,570,750 B1 | 5/2003 | Calcatera et al. | 361/115 |
| 6,672,144 B2 | 1/2004 | Adderton et al. | 73/105 |
| 6,678,813 B1 | 1/2004 | Le | 711/172 |
| 6,684,686 B2 | 2/2004 | Itsuji et al. | 73/105 |
| 6,715,353 B2 | 4/2004 | Johnson | 73/504.04 |
| 6,827,979 B2 | 12/2004 | Mirkin et al. | 427/256 |
| 6,836,112 B2 | 12/2004 | Hennessy | 324/300 |
| 6,862,923 B2 | 3/2005 | Buguin et al. | 73/105 |
| 6,862,924 B2 | 3/2005 | Xi et al. | 73/105 |
| 6,882,429 B1 | 4/2005 | Weitekamp et al. | 356/482 |
| 6,884,981 B2 | 4/2005 | Proksch et al. | 250/201.3 |
| 2001/0000279 A1 | 4/2001 | Daniels et al. | 73/105 |
| 2001/0013574 A1 | 8/2001 | Warren et al. | 250/234 |
| 2001/0035700 A1 | 11/2001 | Percin et al. | 310/324 |
| 2001/0049959 A1 | 12/2001 | Neukermans et al. | 73/104 |
| 2002/0039463 A1 | 4/2002 | Degertekin et al. | |
| 2002/0163648 A1 | 11/2002 | Degertekin et al. | 356/499 |
| 2003/0033863 A1 | 2/2003 | Ashby et al. | 73/105 |
| 2003/0042409 A1 | 3/2003 | Warren et al. | 250/234 |
| 2003/0047675 A1 | 3/2003 | Proksch et al. | 250/234 |
| 2003/0140699 A1 | 7/2003 | Pike et al. | 73/514.32 |
| 2003/0200798 A1 | 10/2003 | Lindig et al. | 73/105 |
| 2003/0200804 A1 | 10/2003 | Johnson | 73/504.12 |
| 2003/0226955 A1 | 12/2003 | Kim et al. | 250/221 |
| 2004/0058591 A1 | 3/2004 | Avazi et al. | 439/894 |
| 2004/0065821 A1 | 4/2004 | Warren et al. | 250/234 |
| 2004/0127025 A1 | 7/2004 | Crocker, Jr. et al. | 438/677 |
| 2004/0129063 A1 | 7/2004 | Balooch et al. | 73/105 |
| 2004/0154367 A1 | 8/2004 | Oumi et al. | 72/325 |
| 2004/0206165 A1 | 10/2004 | Minne et al. | 73/105 |
| 2004/0216517 A1 | 11/2004 | Xi et al. | 73/105 |
| 2004/0218334 A1 | 11/2004 | Martin | 361/139 |
| 2004/0231420 A1 | 11/2004 | Xie et al. | 73/514.32 |
| 2004/0250625 A1 | 12/2004 | Kogan et al. | 73/702 |
| 2005/0013230 A1 | 1/2005 | Adelmann | 369/101 |
| 2005/0017173 A1 | 1/2005 | Kumar | 250/306 |
| 2005/0047721 A1 | 3/2005 | Chen et al. | 385/40 |
| 2005/0048651 A1 | 3/2005 | Ryttsen et al. | 435/459 |
| 2005/0066714 A1 | 3/2005 | Adderton et al. | 73/105 |
| 2005/0145021 A1 | 7/2005 | Chand et al. | 73/105 |
| 2005/0161749 A1 | 7/2005 | Yang et al. | 257/414 |
| 2005/0172717 A1 | 8/2005 | Wu et al. | 73/514.34 |
| 2005/0180678 A1 | 8/2005 | Panepucci et al. | 385/13 |
| 2005/0181132 A1 | 8/2005 | Mirkin et al. | 427/256 |

FOREIGN PATENT DOCUMENTS

| | | |
|---|---|---|
| JP | 07065428 | 3/1995 |
| JP | 10073608 | 3/1998 |
| JP | 10090287 | 4/1998 |
| JP | 200493574 | 3/2004 |

OTHER PUBLICATIONS

Cooper et al., "High-resolution micromachined interferometric accelerometer," Applied Physics Letters, vol. 27, No. 22, May 29, 2000, pp. 3316-3318.

Manalis, et al., "Interdigital cantilevers for atomic force microscopy," Applied Physics Letters, vol. 65, No. 25. Dec. 16, 1996, pp. 3944-3946.

Yaralioglu et al., "Analysis and design of an interdigital cantilever as a displacement sensor," Journal of Applied Physics, vol. 83, No. 12, Jun. 15, 1998, pp. 7405-7415.

Chen et al., "Overview of three-dimensional shape measurement using optical methods," Optical Engineering, vol. 39, No. 1, Jan. 2000, pp. 10-22.

DeWitt et al., "Range-finding method using diffraction gratings," Applied Optics, vol. 34, No. 14, May 10, 1995, pp. 2510-2521.

Solgaard, et al., "Deformable grating optical modulator," Optics Letters, vol. 17, No. 9, May 1, 1992, pp. 688-690.

Ming C. Wu, "Micromachining for Optical and Optoelectronic Systems," Proceedings of the IEEE, vol. 85, No. 11, Nov. 1997, pp. 1833-1856.

Shiono et al., "Planar-optic-disk pickup with diffractive micro-optics," Applied Optics, vol. 33, No. 31, Nov. 1, 1994, pp. 7350-7355.

Jahns et al., "Rapid Communications: Planar integration of free-space optical components," Applied Optics, vol. 28, No. 9, May 1, 1989, pp. 1602-1607.

Lee, et al., "Fabrication and Characterization of a Micromachined Acoustic Sensor with Integrated Optical Readout," IEEE Journal of Selected Topics in Quantum Electronics, vol. 101 No. 3 May/Jun. 2004, pp. 643-651.

* cited by examiner

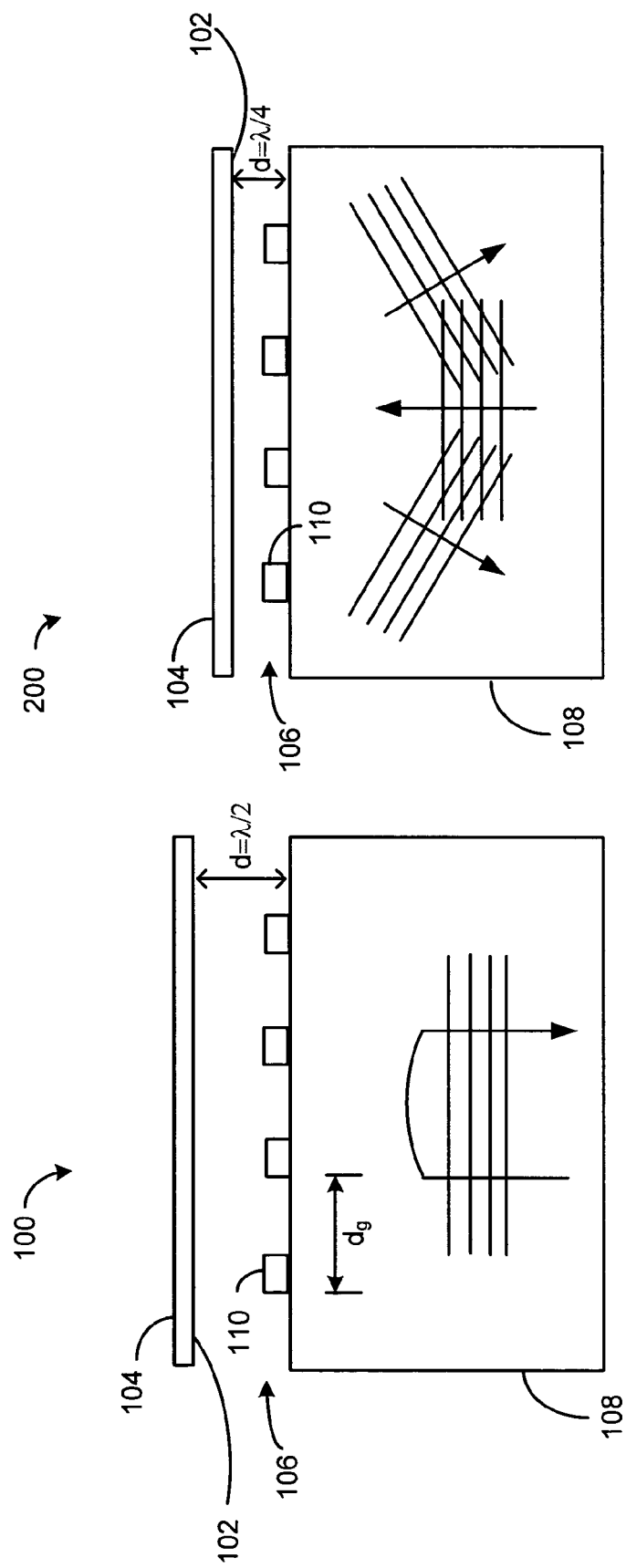

DISPLACEMENT SENSOR EMPLOYING DISCRETE LIGHT PULSE DETECTION

CROSS-REFERENCE TO RELATED APPLICATIONS

This application claims priority to and benefit of U.S. Provisional Patent Application entitled "OPTICAL INTERFEROMETRIC SENSORS WITH LOW POWER CONSUMPTION AND LOW NOISE," assigned Ser. No. 60/634,324, and filed on Dec. 8, 2004, which is incorporated by reference in its entirety.

STATEMENT REGARDING FEDERALLY SPONSORED RESEARCH OR DEVELOPMENT

The U.S. Government may have a paid-up license in this invention and the right in limited circumstances to require the patent owner to license to others on reasonable terms as provided for by the terms of Contract No. DAAD19-00-1-0174, awarded by DARPA through the Army Research Laboratory.

BACKGROUND

1. Technical Field

The present disclosure generally relates to optical sensors, and more specifically, to interferometric optical sensors using a modulated emission of light for displacement measurement.

2. Description of the Related Art

Hearing aids, among a number of other electronic devices, provide specific applications in which miniature displacement measurement devices may be used. Tiny microphone arrays are currently housed in hearing aids to pick up slight acoustic pressures. Conventional microphones such as those used in hearing aids measure a change in capacitance between two conducting plates, one of which (the microphone diaphragm) moves as a function of the acoustic pressure applied. However, other types of miniature displacement measurement devices have been proposed that use optical detection such as anomalous diffraction or interferometry.

For example, exemplary methods and devices for anomalous diffraction are described in the journal article "Laterally Deformable Nanomechanical Zeroth-Order Gratings: Anomalous Diffraction Studied by Rigorous Coupled-Wave Analysis" by Carr D W, Sullivan J P, Friedmann T A, OPTICS LETTERS 28 (18): 1636-1638, September 2003, which is hereby incorporated by reference in its entirety. Optical interferometry, on the other hand, refers to the splitting and recombining of electromagnetic waves, in particular, light waves, to measure surface geometries, distance, etc. Micro-machinery is a growing technology field that often utilizes interferometers because they typically have high resolution and precision. In general, displacement measurements in the sub-nanometer range can be detected with today's interferometers.

U.S. Pat. No. 6,567,572 and U.S. patent application Ser. No. 10/704,932 to Degertekin, et al. disclose a number of displacement sensor embodiments generally comprising a reflector and a diffraction grating spaced a distance from the reflector. The devices can be used measure the displacement of the reflector from the diffraction grating. However, actual implementation of the displacement sensors in portable devices, such as hearing aids, has been hampered by the power use of these sensors. In particular, the power used to illuminate the light source can quickly discharge the batteries typically used in hearing aids.

Although semiconductor laser diodes are known to be more power efficient in comparison to, for example, a stabilized laser such as a Helium-Neon (HeNe) laser, semiconductor lasers have not been favored in high-sensitivity optical detection devices such as displacement sensors because of their thermal instability, low coherence length, and high laser intensity noise.

Additionally, the photo-detectors used for measuring the reflected and diffracted light from the grating and reflector can also introduce undesirable noise into the resulting sensor output.

Accordingly, systems and methods are needed for reducing the power consumption of high-sensitivity optical sensors. Additionally, systems and methods are needed for reducing the effect of thermal instability and/or noise associated with sensors using semiconductor laser diodes and detection electronics.

SUMMARY

Optical sensors, and methods for operating optical sensors, are disclosed. The sensors and methods provide for reduced power operation and/or reduced signal noise in comparison to conventional sensors.

One embodiment of a sensor, among others, includes a reflector, a light source, a reflector, a detector, and a controller. The reflector may be positioned a distance from a reflective diffraction grating. The light source can provide light, a first portion of the light being reflected from the reflective diffraction grating and a second portion of the light passing through the grating to the reflector and being reflected back through the diffraction grating. The detector can sense an intensity of light in an interference pattern formed by the first portion of the light reflected from the diffraction grating and the second portion of the light reflected from the reflector. The controller can be configured to modulate an emission of the light.

An embodiment of a method, among others, for operating a sensor includes the step of modulating a light emission over a duration of time at a modulation frequency. A first portion of the emission of light can be reflected from a reflective diffraction grating and a second portion of the light can pass through the grating to a reflector and then reflected back through the diffraction grating.

Another embodiment of an electronic device includes a sensor for measuring a displacement distance of an integrated reflective mechanical structure. The sensor can include means for pulsing an emission of light over a duration of time at a pulse frequency. A first portion of the emission of light can be reflected from a reflective diffraction grating and a second portion of the light can pass through the grating to the integrated reflective mechanical structure and reflected back through the diffraction grating.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1 depicts a simplified diagram of an optical sensor illustrating the concept of using a diffraction grating to split beams in a microinterferometer.

FIG. 2 depicts an optical sensor of FIG. 1, except having a different distance between the diffraction grating and the reflector.

DETAILED DESCRIPTION

Figure 3:
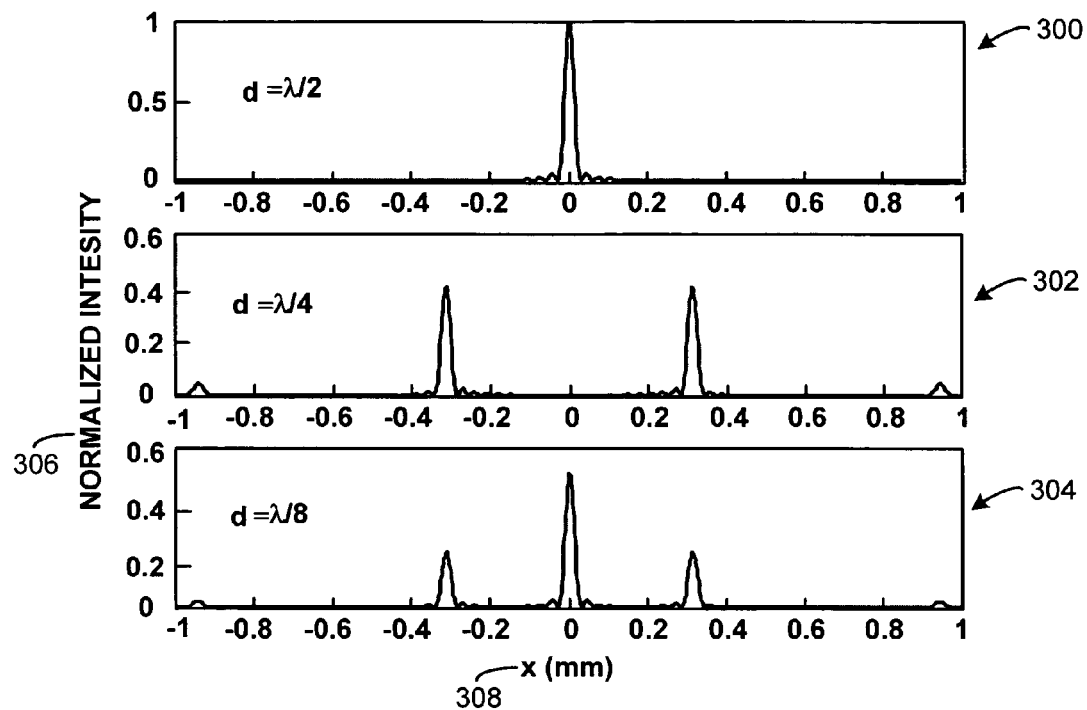
FIG. 3 is a graph illustrating the distribution of reflected light measured on an observation plane with various gap thicknesses utilizing the sensors illustrated in FIGS. 1 and 2.

Embodiments of devices and associated methods for displacement sensing using optical interferometric techniques are disclosed. More specifically, the present disclosure relates to miniature devices for accurately measuring the movement of a mechanical device, such as a flexible membrane that is affected by a number of possible external excitations, such as acoustic pressure, a chemical reaction, acceleration, vibration, and/or other physical forces.

According to the present disclosure, such devices and methods can use a modulated emission of light for reducing power consumption of an associated light source and/or for reducing associated signal noise associated with conventional optical sensors. The modulated emission of light, which may also be referred to as a modulated light emission, can be varied at a modulation frequency. For example, according to one embodiment, the modulated emission of light can be provided by a pulsed light source, which could comprise emitting light at a first high intensity and a second lower relative intensity at the modulation frequency. Such a pulsed light source could be, for example, pulsed on and off (e.g. by powering the light source on and off). According to some embodiments, the modulation could also be provided by causing the light source to emit any other varied light intensity emission at the modulation frequency (e.g. by alternating an amount of power to the light source). The latter may also be referred to herein as a pulsed light source.

According to some embodiments (e.g. those that use a high-speed, pulsed light source for providing the modulated light emission), the light source could be a semiconductor laser diode, such as a Vertical Cavity Surface Emitting Laser (VSCEL). A modulated light source, such as a pulsed light source or any other light source that can be controlled to provided a varied light emission intensity, can be used to reduce the effects of thermal instability by reducing heat buildup in comparison to laser diodes that are operated at a single high intensity. This modulated operation is especially attractive when used with semiconductor laser diodes, which are often associated with these thermal instability issues. Disclosed signal processing devices and methods can be used to further reduce the low frequency noise induced by the detection system.

Yet another potential advantage of using a modulated light source may be the reduction of the effect of shot noise at the photo-detector output. In a shot noise limited system, the signal-to-noise ratio is proportional to the square root of the laser source intensity. Thus, the signal-to-noise ratio can be high when a light source such as a VCSEL is turned on with 2 mW of power. With a selected duty cycle of a fraction of the continuous operation, and sampling the output signal at those instances, a high signal to noise ratio may be obtained with low average power consumption.

Although embodiments described herein may be described as providing such a modulated light emission by varying, or otherwise pulsing, the power provided to the light source, according to some embodiments the modulated light emission could also be provided by an intermittent mechanical (i.e. physical) obstruction between the light source and an associated photo-detector. For example, the obstruction could provide a light emission having a constant (non-modulated) intensity, while an opaque, reflective, and/or semi-transparent obstruction intermittently obscures at least a portion of the emission of light at the modulation frequency. Other methods well-known in the art, such as acousto-optic modulators, may also be used for providing the modulated light emission.

The systems and methods of the present disclosure are amenable to integration of electronics and optics to form compact displacement detectors for a single membrane or membranes fabricated in the form of arrays. Typical applications of the present disclosure would be in, for instance, but not limited to, microphones (micro-machined or not), micro-machined ultrasonic transducers, micro-machined ultrasonic wave generators, micro-machined ultrasonic image applications, pressure sensors, accelerometers, vibration sensors, seismographs, and hearing aids. The present disclosure would also be useful in any sensing application where the position of a reflector or membrane is changed due to a chemical or physical process and this displacement needs to be measured accurately in a broad frequency range. Furthermore, the present disclosure would also be useful in any sensing application where the reflectivity of a reflector or a membrane is changed due to a chemical or physical process and this change needs to be measured accurately in a broad frequency range.

Referring now in more detail to the drawings, FIGS. 1 and 2 illustrate the concept of using a diffraction grating to split beams in a microinterferometer. Such a concept has been utilized in measuring precise relative displacements, such as for the measurement of Atomic Force Microscopy (AFM) tip displacement and in spatial light modulators, as in the grating light valves (GLV). This concept is also disclosed in U.S. Pat. No. 6,567,572 entitled "Optical Displacement Sensor" to F. L. Degertekin, et al. and pending U.S. patent application Ser. No. 10/704,932 to Degertekin, et al., each of which are hereby incorporated by reference in their entirety. Each of these references provide a number of exemplary sensor structures which could be used in conjunction with the systems and methods of the present disclosure. FIGS. 1-4 disclose the general principles of these sensor structures.

The diagrams of FIGS. 1 and 2 illustrate two scenarios. A first scenario 100 depicts a reflective target surface 102 of a mechanical element 104 placed a distance of a half-wavelength, $\lambda/2$, away from a reference point, in this case, a reflective diffraction grating 106. The mechanical element 104 may be, for example, a flexible membrane or a moveable beam. The target surface 102 may comprise a reflector formed from any number of optically reflective materials.

A second scenario 200 of FIG. 2 depicts target surface 102 being positioned a distance of a quarter-wavelength, $\lambda/4$, away from the diffraction grating 106. The detailed diffraction pattern of such a structure can be found by applying standard diffraction theory to determine the locations and the dimensions of the photo-detectors or light guide apertures. For at least the reason that the distance between the interference generating reflective target surface and diffraction grating are generally quite small, the low coherence length of conventional VSCEL diodes do not hinder their use in the disclosed embodiments.

The reflective diffraction grating 106 can be formed on a transparent substrate 108. The diffraction grating 106 can be formed of an array of diffraction grating fingers 110 equally spaced along a front edge of the transparent substrate 108. It should be noted that, as mentioned above, this diagram is not to scale, and is merely for illustrative purposes. For example, in reality, the diffraction grating fingers 110 would typically have a height on the order of micro- or nano-meters.

In the first scenario 100, when an incident light is illuminated through the transparent substrate 108, a first portion of the incident light is reflected from the reflective diffraction grating 110. A second portion of the incident light is transmitted through, and diffracted about, the diffraction grating fingers 110. The transmitted and diffracted light reflects off of the reflective target surface 102 and is measured by a proper detector (not shown), such as a photo-detector or a photo-diode. Such a detector may measure the intensity of the light in the interference patterns created from the reflected and diffracted light. The detector may, for example, be positioned below the transparent substrate.

Looking to scenario 100, the target surface is placed at a distance of $\lambda/2$ or any integer multiple, thereof. In this case, the 0th order of the transmitted incident light is reflected back. In general, the 0th order is the transmitted light that is illuminated directly, in which case no diffraction, or change in direction occurs. The first portion of the incident light, and the second portion of the incident light which has been reflected off of the target surface 102 interferes with each other. The phase of the two portions of the light waves form constructive and destructive interference patterns. From the interference patterns, the relative distance between the diffraction grating 104 and the target surface 102 can be determined.

Looking to scenario 200, the target surface 102 has been positioned a distance of $\lambda/4$ away from the diffraction grating 106. In practice, the target surface 102 may be placed at any integer multiple of $\lambda/4$ and the same general results will occur.

When the first portion of the incident light joins with the second portion of the incident light upon reflection, destructive interference cancels out the two. The second portion of the light travels an extra distance of 2× the distance between the target surface 102 and the diffraction grating 106, which results in a phase difference between the two portions of $\pi$, complete destructive interference. On the contrary though, the higher order diffraction fields, such as the first order, can constructively interfere with the first portion of the incident light.

Having described an example of using a diffraction grating to split light beams and therefore measure relative distance, theoretical calculations will be utilized to show the results of using the device described in FIGS. 1 and/or 2. An incident light of $\lambda$=632 nm can be illuminated through the transparent substrate 108 onto the reflective diffraction grating 106. A light source, such as a laser (not shown), can be utilized to provide the incident light. Suppose the diffraction grating 106 contains 10 diffraction grating fingers 110 equally spaced at $d_g$=2 μm. FIG. 3 is a graph 300 illustrating the distribution of reflected light measured on an observation plane with various gap thicknesses utilizing the devices illustrated in FIGS. 1 and 2. Hereinafter, the distance between a reference point (in this case the diffraction grating 106) and the target surface 102 will be referred to as the gap thickness and can be considered the absolute distance between the target surface 102 and the reference point.

FIG. 3 includes three graphs 300, 302, and 304 depicting the normalized intensity of reflected light 306 (y axis) versus an observation length 308 (x axis) associated with three scenarios, as measured by a photo-detector. Said another way, graphs 300, 302, and 304 show an intensity distribution on the photo-detector plane for different values of normalized membrane-grating separation. The observation length is in the lateral direction across the photo-detector, and centered at the 0th order beam. Scenario 300 shows the normalized intensity 306 with gap thickness of d=$\lambda/2$. Scenario 302 shows the normalized intensity 306 with gap thickness of d=$\lambda/4$. Scenario 306 shows the normalized intensity 306 with gap thickness of d=$\lambda/8$.

As expected, scenario 300 depicts the 0th order reflected beam with complete constructive interference. The higher order beams, e.g. the 1st and 3rd order beams, incur destructive interference, thereby canceling out their intensities. Scenario 302 depicts that the 0th order has been completely cancelled out and the 1st and the 3rd orders of the reflected beam appear to have partial intensity. Scenario 304 shows that with a gap thickness of d=$\lambda/8$, both the 0th order and the 1st order contain some light intensity. The figures collectively illustrate that the periodic nature of the intensity of the orders of the reflected light versus varying gap thickness.

Figure 4:
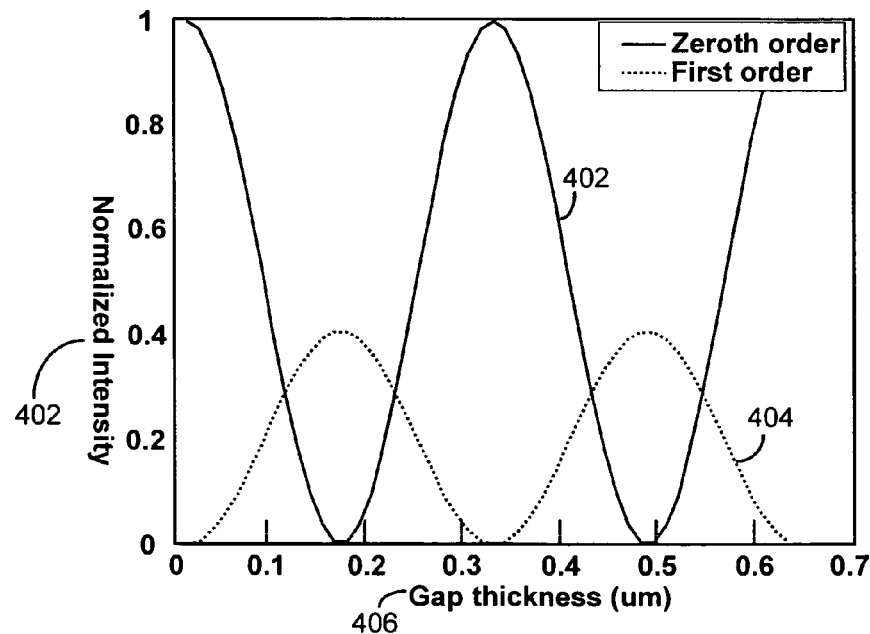
FIG. 4 is a graph illustrating the normalized intensity of the $0^{th}$ and $1^{st}$ diffraction orders versus gap thickness utilizing the sensor concepts illustrated in FIGS. 1 and 2.

The intensity of these orders as a function of grating-reflecting surface is depicted by the $\cos^2(2\pi d/\lambda)$ and $\sin^2(2\pi d/\lambda)$ variation illustrated in FIG. 4. Specifically, FIG. 4 depicts a graph 400 illustrating the normalized intensity 402 (y-axis) of the 0th diffraction order 402 and the $1^{st}$ diffraction order 404 versus the gap thickness 406 utilizing the device described in FIGS. 1 and 2.

As depicted in FIG. 4, the 0th order curve 402 takes on a cos $2(2\pi d/\lambda)$ shape. This is in line with the results depicted in FIG. 3. At gap thickness of $\lambda/2$, which is approximately 0.316 μm, the intensity is greatest. At gap thickness of $\lambda/4$, which is approximately 0.158 μm, the intensity is zero. The 1st order curve 404 takes on a sin $2(2\pi d/\lambda)$ shape. The graph 400 of FIG. 4 clearly displays the periodic nature of the diffraction orders. As one can see, keeping all other variables constant and known, one can calculate the relative distance between the reflective surface 102 and the diffraction grating 106 by measuring the intensity of the orders (e.g. the 1st order). By monitoring the intensity of the reflected orders, it is possible to achieve interferometric resolution on the order of $1 \times 10^{-5}$ Å/$\sqrt{Hz}$.

Depending on the periodicity of the grating and the gap between the grating and the reflector, the reflected light intensity of the orders may have a strong dependence on the gap thickness with a relation different than the sinusoidal variation depicted in FIG. 4. The particular relation can be obtained from detailed vectorial calculations of the optical fields in that structure including the grating, cavity between the grating and the reflector, and the reflector. The anomalous diffraction effects in gratings with sub-wavelength periodicity may be responsible for this intensity variations such as described in Carr D W, Sullivan J P, Friedmann T A, "Deformable Nanomechanical Zeroth-Order Gratings: Anomalous Diffraction Studied by Rigorous Coupled-Wave Analysis," OPTICS LETTERS 28 (18): 1636-1638 September 2003.

Now that a general understanding of the concepts behind an optical sensor has been described, one embodiment of a low-power and/or low-noise sensor is described. It should be emphasized that the actual sensor structure can be implemented in a variety of physical embodiments, and the embodiments described herein are merely for illustration. For example, the concepts behind the disclosed low-power and/or low-noise sensor can be applied to the structural embodiments of the sensors described in U.S. Pat. No. 6,567,572 entitled "Optical Displacement Sensor" to F. L. Degertekin, et al. and pending U.S. patent application Ser. No. 10/704,932 to Degertekin, et al.

Figure 5:
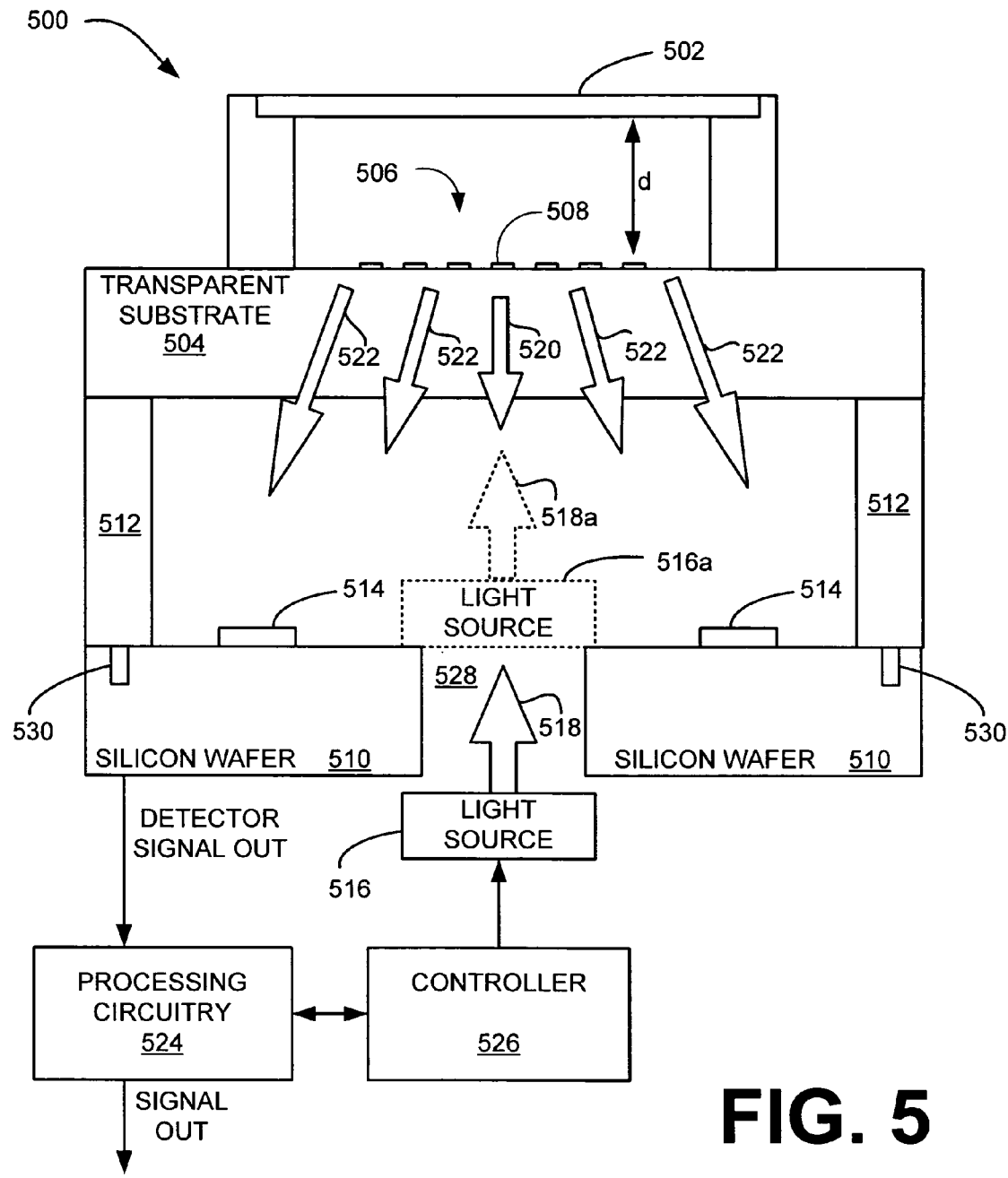
FIG. 5 depicts a cut-away, side view of an embodiment of a micro-displacement sensor in accordance with the present disclosure.

However, for the purposes of illustration, FIG. 5 provides a side, cut-away view of one exemplary sensor structure 500 that can be used to implement the low-power, low-noise characteristics described herein. Sensor 500 generally includes a mechanical structure in the form of a surface micromachined reflective membrane 502. The reflective membrane 502 is suspended above a transparent substrate 504. A reflective diffraction grating 506 having grating fingers 508 is formed on the surface of substrate 504 and serves as the nonmoving reference. The diffraction grating may, for example, include a 50% fill factor.

As already described, the diffraction order intensities and can be expressed as a function of the gap thickness (depicted as distance "d") between the reflective membrane 502 and the diffraction grating 506. Accordingly, in some embodiments, it may be desirable for the gap thickness to be adjustable as described in U.S. patent application Ser. No. 10/704,932. That is, some embodiments may include a tunable diffraction grating and/or membrane that can be electrostatically actuated via an electrical bias in order to position the grating and/or membrane at an optimal distance from one another. The cavity formed between the reflective membrane 502 and the transparent substrate 504 could be substantially sealed, or could include a number of holes, allowing the pressure inside the cavity to be maintained substantially at the atmospheric pressure.

According to one embodiment, the transparent substrate 504 is elevated above a second substrate, here depicted as silicon wafer 510, by a spacer 512 (e.g. through conventional wafer bonding techniques or as otherwise described hereafter). Silicon wafer 510 may include one or more detectors (e.g. photo-detectors, photodiodes, etc.) for detecting the intensity of reflected and diffracted light. The photo-detectors may be arranged in an array. According to the present embodiment the detectors are represented as photo-detectors 514.

A coherent light source 516 can be positioned underneath the transparent substrate to provide an incident light 518. The reflected light (e.g. from the reflective surface of sensor membrane 502 and grating 506) is diffracted into a 0th order 520 (specular) and odd orders 522 for the ideal grating with 50% fill factor assumed here. As will be described below with respect to an embodiment described as a system-on-package (SOP), it should be understood that there is no requirement that light source 516 is positioned below wafer 510. Rather, light source 518 could be positioned above, on, or embedded within the wafer 510, for example.

According to the present embodiment, a VCSEL is used as the light source 516. One exemplary VCSEL emits light having an 850 nm wavelength through an 18 μm aperture. According to the present embodiment, the diffraction grating can include a 4 μm period, and the view plane of the detectors 514 can be 1 mm behind (below, according to the orientation of FIG. 5) the transparent substrate 504. Using these light source, grating, and gap thickness parameters, three 300 μm×300 μm photo-detectors 514 separated by 275 μm can be used to measure the intensity of the 0th and 1st diffraction orders (only two detectors 514 are depicted in the view of FIG. 5). According to this embodiment, these photo-detectors 514 can receive most (e.g. approximately 90%) of the source power for optical detection without the need for other optical components, assuming that other losses, such as reflections, are negligible. The low number of powered components can be advantageous for low-noise, low-power operation of the sensor 500.

According to such an embodiment, the size of the micromachined acoustic sensor 500 can be reduced to approximately 2 mm, including the VCSEL and integrated photo-detectors 514 (assuming 0.5 mm-thick substrate 504, 0.5 mm thick wafer 508, and a 1 mm-thick spacer 512). Such a construction can be suitable for the construction of closely spaced micromachined acoustic sensors with matched characteristics that can be particularly useful in precision acoustic instruments such as intensity probes and for realizing front-end sensors in the implementation of newly developed signal processing algorithms for small-scale microphone arrays and hearing aids.

The output of the one or more photo-detectors 514 can be placed in electrical communication with appropriate processing circuitry 524. Processing circuitry 524 m a y be integrated within the sensor 500, fabricated on wafer 510, on a related printed circuit board, or completely external to the sensor 500. Processing circuitry 524 may be any type of electrical component that can process the signals received by the photo-detector 514. Likewise, hardware, software, and/or firmware may be utilized to properly make the appropriate calculations. For example, a personal computer, server, laptop, or other computing device may be configured to process the signals received from the photo-detector 514 to calculate the change in distance "d" as a function of time (e.g. thus also providing the value of the distance "d" at any given time). A digital signal processor (DSP) or an application specific integrated circuit (ASIC) may be utilized to perform such calculations. The processing circuitry 524 may also be capable of making several other calculations and/or perform other functions, such as calibration, laser intensity normalization, analog to digital conversion, digital filtering, and signal conditioning, and electrical connections from the processing circuitry to the appropriate devices (e.g. light source, the electrical terminals of the membrane and/or diffraction grating, a voltage source for providing an electrical bias, etc.) for carrying out these functions is provided in such embodiments.

Additionally, a controller 526 can be provided for controlling the modulation of the light emission. For example, controller 526 may control the power provided to light source 516, or could provide the signals for mechanical modulation of the light detected by detector 514 (e.g. by controlling a physical opaque, reflective, and/or semi-transparent obstruction as briefly described above). According to the embodiment of sensor 500, the controller 526 can be communicatively and/or electrically coupled to light source 516. An embodiment of controller 526 configured to modulate the power provided to light source 516 (i.e. causing light source 516 to be a modulated light source) will be described in more detail below.

Additionally, controller 526 may be in communication with processing circuitry 524 to receive instructions for controlling the light emissions of light source 516 and/or to transmit information related to the control signals used to control light source 516 to the processing circuitry 524. This information transmitted between processing circuitry 524 and controller 526 could, for example, represent the frequency (e.g. modulation frequency), duration, and/or duty cycle used (or to be used) by controller 526 to provide power to light source 516 from a power source (not depicted). A power source could be, for example, a battery or other DC and/or AC power source.

The specific fabrication of the sensor 500 is outside the scope of the present disclosure. However, a number of steps are briefly discussed to assist in setting forth an understanding of the structure. The portion of sensor 500 generally comprising the membrane and the diffraction grating on the transparent substrate can be fabricated using semiconductor manufacturing techniques described in, for example, U.S. Pat. No. 6,567,572 entitled "Optical Displacement Sensor" to F. L. Degertekin, et al. and pending U.S. patent application Ser. No. 10/704,932 to Degertekin, et al. The photo-detectors 514 on wafer 510 can be fabricated using n-well CMOS technology. For example, two different p-n-type photo-detector structures are designed to detect light emitted from a VCSEL; n-well/p-substrate and a vertical combination of $p^+$-source (drain)/n-well and n-well/p-substrate. According to the present embodiment, these deep junctions are suitable for at least the reason that silicon has a small absorption coefficient of about $0.06\,\mu m^{-1}$ at a typical VCSEL wavelength of 850 nm. Through-wafer holes 528 can be etched into wafer 510 using a post-CMOS process to provide the optical interconnection between the light source 516 and the membrane 502 (and diffraction grating 506). Additionally, a number of holes may be etched to provide a receptacle for each of the small posts or columns 530 formed in the bottom of spacer 512.

According to some embodiments, wafer 510 can be secured to a printed circuit board (PCB). Light source 516, such as the described VSCEL or light transmitted by optical fiber, may be affixed to the PCB and aligned with the through wafer hole 528 to allow the light to couple to the device from the backside of device 500. It should be understood that wafer 510 may include multiple sets of detectors 514 and through holes 528 to be matched with an equal number of structures forming the transparent substrate 504, membrane 502, and grating 506 to form the integrated sensor device. Thus, large numbers of sensors 500 can be fabricated in a small area.

Spacer 512, which can be manufactured using laser stereolithography, for example, can then mounted on top of the wafer 510 to space the wafer a distance from the substrate, thereby providing the view plane for detectors 514. The alignment of the spacer 512 with respect to the wafer 510 can be aided by the alignment of small columns or posts 530 in the bottom of the spacer, which fit into the through-holes etched in corresponding positions in the wafer 510.

Once the photo-detectors 514 are fabricated, the wafer 510 can be assembled with the portion of the sensor including transparent substrate 504, membrane 502, and grating 506 to form the integrated sensor device. Specifically, the sensor structure built on the transparent substrate can then aligned and bonded with the wafer 510 using a surface-mount rework system and predefined alignment marks on both devices. Finally, the photo-detectors 514 can be wire bonded for signal readout to appropriate circuitry. For example, the photo-detectors may supply detector output signals to processing circuitry 524 or other circuitry that may monitor, respond to, or otherwise process the signals generated by the photo-detectors 514.

One advantage of the general configuration of sensor 500 is the capability of implementing a fully assembled system-on-package (SOP) by bonding a laser diode, such as a VCSEL, on the wafer 510. This embodiment is depicted by light source 516a, which provides incident light 518a. That is, instead of aligning the sensor 500 with an off-device light source 516, the sensor 500 includes a light source 516a attached to the silicon wafer 510. Additionally, although conventional VCSEL lasers are manufactured using GaAs semiconductor processing techniques, photo-detectors have also been manufactured using GaAs fabrication. Thus, according to some embodiments, the high-speed light source could be manufactured on (e.g. embedded within) the same wafer substrate as the detectors. In either of these cases, it should be understood that through wafer holes 528 are not needed in these embodiments. Additionally, in some embodiments, the incident light and reflected light can be coupled to the sensor through optical fibers.

An SOP embodiment using continuous operation of the assembled laser diode can result in heat buildup inside sensor 500. This heat dissipation can adversely affect the functionality of the sensor 500. Accordingly, for at least this reason, such an SOP configuration has not previously been thought to be desirable.

Additionally, in certain applications, it is advantageous to provide a sensor having low-power usage (e.g. hearing-aid microphones). As one example, if the sensor 500 is used in a hearing-aid microphone, the sensor operates from a 1-2 V battery typically found in such devices. It is desirable that the sensor consume only about 100-200 μW of average power. A typical VSCEL can operate above the lasing threshold using a 1.5 V voltage and a 2 mA current. However, this exemplary configuration uses 3 mW of average power, which is well above the desired average power consumption. Accordingly, continuous operation of a light source, such as a VCSEL, can be prohibitive in certain applications.

However, it has been discovered that a modulated operation of the light source 516/516a can be implemented to alleviate these potential issues, among others. Specifically, according to one embodiment, a pulsed-mode operation can be used to provide such benefits. For example, a sensor 500 including a pulsed 850-nm VCSEL as the light source can be controlled using a train of light pulses generated at a predetermined frequency and duration. For example, according to one embodiment, controller 526 can switch the VCSEL into its operational state (e.g. emitting light or "ON") at a frequency of 10 kHz and with a 50% duty cycle (with respect to continuous operation). Although this embodiment refers to a VCSEL as the high-speed light source, any other high-speed laser diodes, such as those used in optical communication systems, could also be used in this pulsed operation.

It should be understood that the term "high speed," with respect to a pulsed light source, refers to the frequency at which the intensity of the light source can be modulated (e.g. turned on and off and/or otherwise varied between at least two desired intensities). For example, light sources continue to emit an amount of light even after being de-energized for a period of time. Likewise, after being energized, light sources require some period of time to actually emit a desired amount of light. Thus, high-speed light sources are those that can quickly emit a desired amount of light after energizing and/or those that can quickly reduce their light emission under a desired amount after de-energizing the light source. Because the pulsing of the light provides a sampling of the continuous signal the "high speed" light source may be selected such that it is able to be pulsed at a high enough frequency, for example twice the Nyquist frequency, for the desired signal in order to avoid aliasing. Of course, the actual frequency of the pulsing will vary depending on a number of factors.

Figure 6:
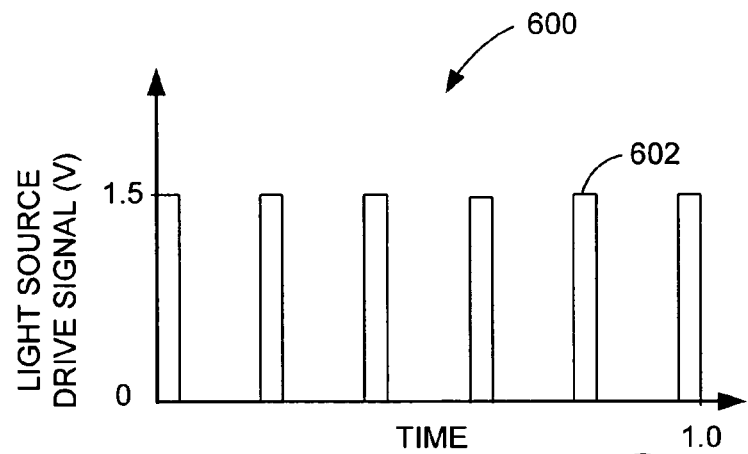
FIG. 6 depicts a graph of an exemplary light source drive signal that can be provided over a period of time to pulse the light source of the sensor of FIG. 5.
Figure 7:
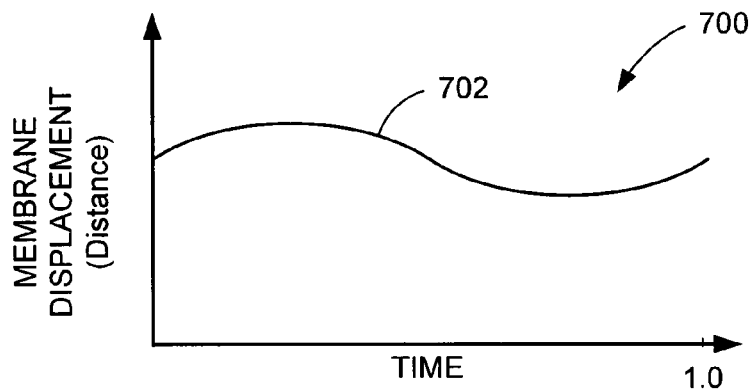
FIG. 7 depicts a graph of the displacement of a membrane over the period of time depicted in FIG. 6.
Figure 8:
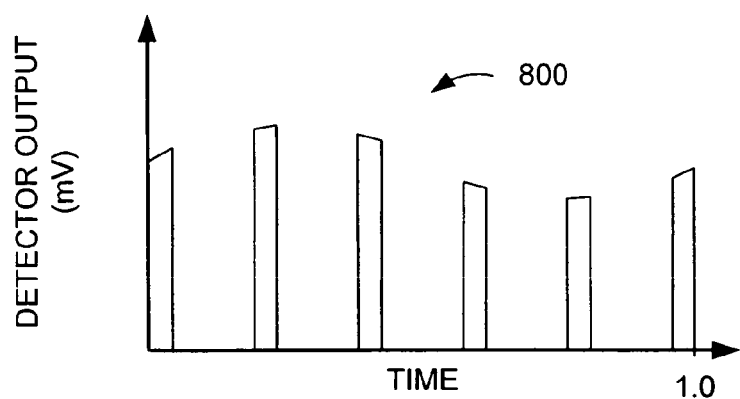
FIG. 8 depicts a graphical representation of the output of a photo-detector, subjected to light output from a light source driven by the pulsed light source drive signal of FIG. 6, over the same time period.

FIGS. 6-8 generally depict a number of waveforms useful for visualizing the signals related to the described pulsed operation. FIG. 6, for example, depicts an exemplary light source drive signal 600, such as the signal provided by controller 526 to light source 516 or 516a. The exemplary drive signal 600 provides 1.5 volts to the light source at a frequency of six pulses per unit of time. The units of time, for simplicity, are arbitrary for the purposes of this example. The pulses energize the light source for a duration represented by the width of each pulse 602. The pulsing frequency (i.e. the modulation frequency) and/or pulse duration can be programmable and could also be varied over time.

FIG. 7 depicts a graph 700 depicting the movement of a membrane over the arbitrary period of time represented in FIG. 6. The wave 702 represents, for example, the distance d (FIG. 5) between the reflective surface of membrane 502 and diffraction grating 506. The wave is representative, for example, of a continuous-wave output of a photo-detector output in response to continuous supply of a light source.

FIG. 8 depicts a graph 800 having a representation of the output of a photo-detector, subjected to light output from a light source driven by the pulsed light source drive signal 600 of FIG. 6, over the same time period depicted in FIGS. 6-7. The resulting output signal can be thought of as a sampled version of what the continuous-wave output would be if the light source had been continuously powered to emit light during the entire duration of time.

Figure 9:
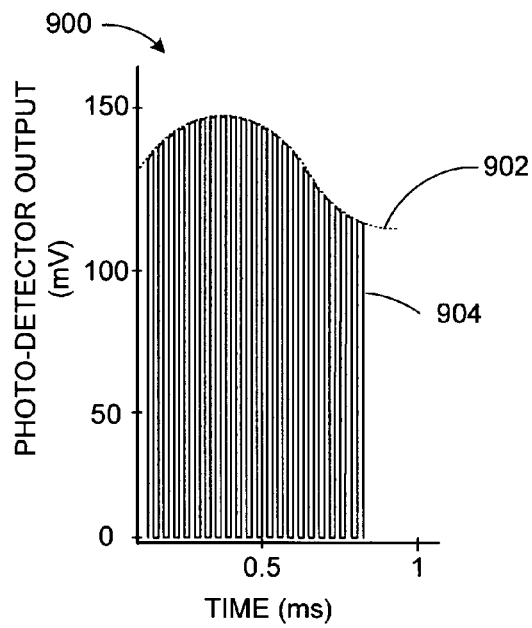
FIG. 9 depicts another graphical representation of exemplary signals measured at the output of a photo-detector in a first, continuous-wave mode and in a second, pulsed mode.

FIG. 9 depicts a graph 900 depicting yet another example of the signals measured at the output of an exemplary photo-detector in a continuous wave mode 902 (e.g. similar to FIG. 7) and in a second pulsed mode 904 (e.g. similar to FIG. 8) when the light source is optically coupled to the integrated acoustic sensor and the membrane 502 is electrostatically driven at 1 kHz. Although graph 900 depicts the photo-detector output in mV, it should be understood that some detectors provide such output as a current (i.e. photocurrent). Thus, the depicted output has been converted to the depicted voltages, representative of such current output, by appropriate circuitry.

Although the pulsed mode 904 signal output generally depicts a duty cycle of approximately 50%, a desired power consumption can be achieved by adjusting the duty cycle. For example, adjusting the duty cycle downward to as low as 5% (or even lower) of continuous operation can be used.

As mentioned previously, the pulse modulation frequency can also be selected based on design requirements. For example, the pulse modulation frequency can be configured to be a value twice the maximum frequency of the desired measurement signal to avoid aliasing problems.

The modulation of the light source can be beneficial in more ways than power consumption. For example, because the average power consumption is relatively small, the light source is not heated to as high of a temperature as encountered during continuous operation. Thus, thermal instability and thermal drift issues associated with lasers, such as VCSEL lasers, are mitigated. Additionally, any undesirable heat that could affect other features of the sensor is likewise mitigated (e.g. excessive heat could change the flexibility of the membrane).

Further, modulation of the light emission from the light source provides some inherent characteristics useful for further reducing noise in the output signal, and these benefits are present independent of which method is used for providing the modulated light source (e.g. a modulated light source, mechanical obstruction, etc.). For example, the noise induced by photo detection and other sensing electronics is relatively low frequency (e.g. below 5-10 kHz), while the modulation frequency of the light emission can be relatively high. Effectively, the frequency spectrum of the photo-detector output can become a sampled version of the sensor displacement signal. Thus, the frequency that the light emission is modulated can be selected to be high enough to prevent aliasing. With the high-frequency sampling and pulsed modulation of the light source, replicas (i.e. harmonics) of the baseband displacement signal spectrum are generated at multiples of the modulation frequency at the photo-detector output.

By way of example, if the membrane displacement is sampled at 200 kHz, the output signal of a detector includes signals centered around 0 (DC), 200 kHz, 400 kHz, etc. It should be understood that the replicas do not, of course, extend to infinity, but rather occur in an envelope shape determined by the duration and shape of the individual pulse that turns the light source on and off. The low frequency noise in the detection electronics remains concentrated in relatively low frequency ranges (e.g. below 10 kHz). Thus, the output signal of the detector can be processed to reduce the influence of the low frequency signal noise.

Thus, it should be apparent that even sensors using light sources that are not controlled to provide the modulated (e.g. pulsed) light emission can still benefit from the described techniques. For example, the light source could provide a light emission having a constant (non-modulated) intensity, while an opaque, reflective, and/or semi-transparent obstruction is controlled to intermittently obscure at least a portion of the emission of light at the modulation frequency. Accordingly, a modulated light emission is created from the original non-modulated emission. Although such embodiments may not provide the described benefit of low-power operation, these embodiments can remain useful for reducing noise introduced in many optical sensors and/or detectors. Additionally, according to such an embodiment, the light source used does not require any particular "high speed" properties because the light source itself does not need to be modulated to provide the modulated light emission. Thus, the light source could be any coherent light source, such as an HeNe laser.

One such intermittent obstruction could be provided by a spinning structure (e.g. wheel, etc.) having a number of openings aligned with the light emitted by the light source, for example. As the wheel spins, the light is intermittently emitted towards the photo-detector at a time when the laser and slit are aligned, thereby allowing light to pass through the opening. The controller could, for example, control the frequency that the openings are aligned with the emitted light.

Another exemplary intermittent obstruction suited for miniature sensors can include a digital micromirror device (DMD), such as the DMD developed by Texas Instruments, Inc. of Dallas, Tex. For example, non-modulated light could be directed at one or more mirrors on such a DMD, and the one or more mirrors could be modulated at the modulation frequency to provide the modulated light emission. For example, when a mirror is moved to a first position the non-modulated light can be directed towards a reflector and diffraction grating of the sensor, and when the mirror is moved to a second position the light emission is directed away from the reflector.

Thus, in the first position, a first intensity of light is reflected and diffracted towards the photo-detector, and at the second position, a second intensity of light (which could be no light) is received at the detector. Of course, any number of other embodiments having intermittent mechanical obstructions are possible and are outside the scope of this disclosure.

Accordingly, attention is now directed to a number of potential embodiments of processing circuitry 524, which can be used to process and/or demodulate the signals that are output by the detector 514. Although the processing circuitry 524 embodiments described herein may be depicted and described as circuit components, it should be understood that the blocks could also represent functional modules of software that can be used to process the signal having similar functions.

Figure 10:
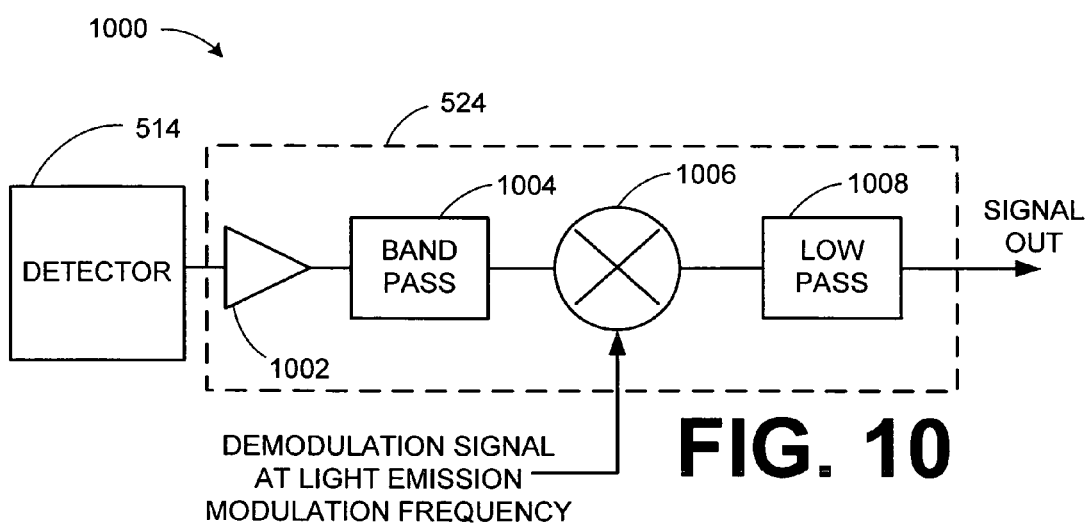
FIG. 10 depicts a block diagram of an embodiment of the processing circuitry of FIG. 5 comprising a coherent (synchronous) detector.

FIG. 10 depicts a first exemplary embodiment of the processing circuitry 524 of FIG. 5, which can be generally referred to as a coherent demodulator 1000. Here, the signal output from detector 514, which could be a photocurrent, can be converted to voltage by an amplifier 1002 (or other appropriate circuitry), which then amplifies the signal. A band-pass filter 1004 may then filter the amplified signal, passing only the portion of the signal around the sampling frequency or a harmonic (i.e. multiple) of the pulsing frequency, here 200 kHz. Finally, coherent (e.g. synchronous) detection can be used to recover the original baseband signal. Specifically, the signal output from the bandpass filter may be mixed with a sinusoidal signal produced at the modulation frequency, or the harmonic frequency, of the light emission using mixer 1006. For example, here, a signal representing the modulation frequency of the light source can be passed into mixer 1006. The mixed signal can then be passed through a low pass filter 1008 to produce the processed, low-noise output signal (e.g. with the effects of the low-frequency phenomena greatly reduced).

Figure 11:
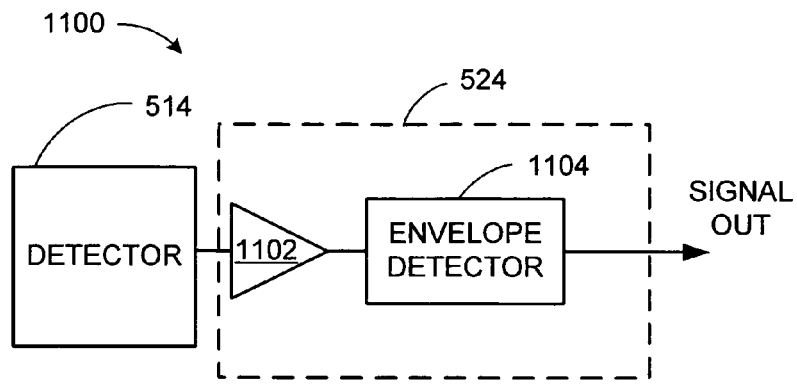
FIG. 11 depicts a block diagram of another embodiment of the processing circuitry of FIG. 5 comprising an AM demodulator having envelope detection.

FIG. 11 describes yet another potential embodiment of processing circuitry 524, depicted here as AM demodulator 1100. The principles of operation of AM demodulator 1100 are based on the realization that the detector 514 output of a diffraction based optical sensor using the modulated light source becomes an amplitude-modulated pulse train. Therefore, the output of detector 514 is suitable for conventional AM demodulation techniques based on envelope detection.

Accordingly, the embodiment of FIG. 11 depicts a simple block diagram of one such embodiment of an AM demodulator that could be used to process the output of detector 514. Here, amplifier 1102 amplifies the output signal from detector 514. Amplifier 1102 (or other appropriate circuitry) may also convert the output signal of detector 514, which may be a current, into an appropriate voltage signal. The amplified signal can then be passed into an envelope detector 1104. The output of envelope detector 1104 can be configured to produce output signals within the desired measurement signal bandwidth.

Figure 12:
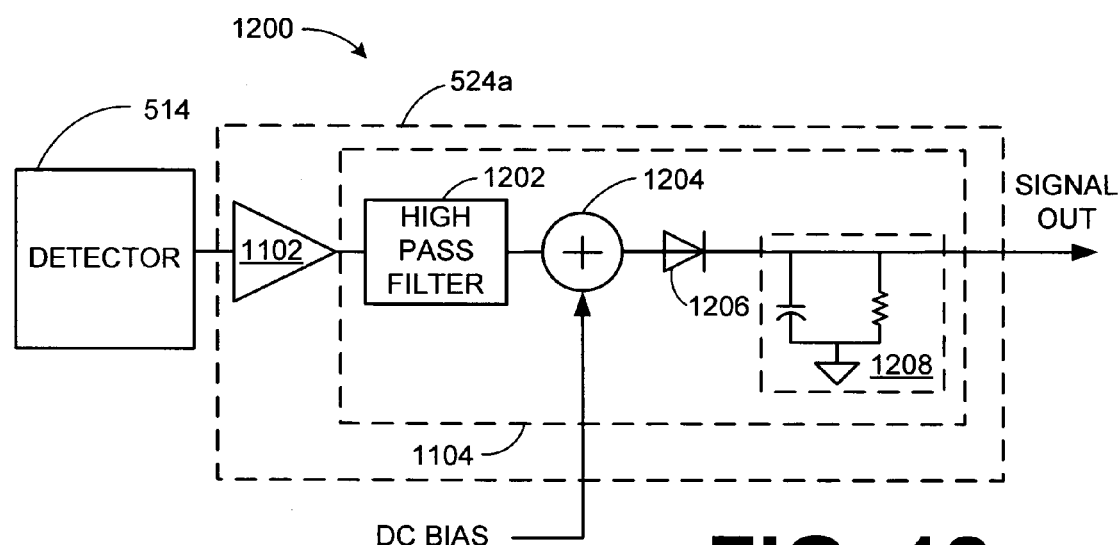
FIG. 12 depicts a schematic diagram of an embodiment of an AM demodulator of FIG. 11 comprising a high pass filter and an envelope detector to reduce low frequency noise.

FIG. 12 describes one embodiment of a simple envelope detector circuit 1200 that could be used to implement the AM demodulator 1100 of FIG. 11. Specifically, the output signal of detector 514 is converted to a voltage signal and amplified with amplifier 1102. The output signal of amplifier 1102 is passed to envelope detector 1104, which can include a high-pass filter 1202, an input for a DC bias 1204, diode 1206, and a low-pass filter (here represented as resistor-capacitor (RC) filter 1206). It should be understood that, according to some embodiments, high-pass filter 1202 and/or the input for adding the DC bias 1204 could be considered to be pre-processing circuitry that is separate from the envelope detection (here performed by diode 1206 and RC filter 1206).

Thus, the output of amplifier 1102 is passed through a high-pass filter 1202 to substantially remove the base-band replica of the signal and the majority of the low-frequency noise. This leaves the remaining replicas of the signal, which include relatively little low-frequency noise. According to one embodiment, the high-pass filter is configured to pass a portion of the amplified signal at a frequency higher than half of the modulation frequency. Although some signal power is lost by removing the baseband signal, the copy of the signal with lowest signal-to-noise ratio is sacrificed while keeping the remaining replicas.

Since the DC bias is also removed, in order for the diode to conduct during the pulses, a DC bias (preferably from a low noise source), can be added to the signal output from the high pass filter 1202 to shift the average voltage the signal passed through the high-pass filter. Here, such a DC bias is added at DC bias input 1204.

Once the DC bias has been added to the signal, the envelope detection can be performed by diode 1206 and RC filter 1208. Specifically, diode 1206 can be used detect the envelope of the incoming signal from high pass filter 1202 that has been shifted by the DC bias. The output of diode 1206 is then passed to a low pass filter, which is embodied here by a resistor-capacitor (RC) filter 1208. As is known from AM demodulation techniques, the RC filter cutoff can be selected to be well below the sampling (pulsing) frequency of the light source and higher than the acoustic signal bandwidth.

It should be understood that the above is merely one embodiment of a potential AM demodulator, and other AM demodulation schemes could be used, such as those incorporating a DC bias shifter with the envelope detection. The important aspect is the realization that low-complexity AM demodulation circuitry can be used to provide a low-power demodulation alternative. For example, in comparison to the coherent detector 1000, the simplicity of the AM demodulator 1100 can provide lower power consumption for at least the reason that there is no need for a local oscillator or multiplier. Furthermore, the design of AM demodulator 1100 can be more effective in recovering maximum signal energy. For example, coherent detection (by mixing the signal with a sinusoid and low pass filtering) uses only one of the replicas of the signal in the frequency domain, while an AM demodulator using envelope detection uses much more of the available power in the signal. Although an envelope detector based demodulator can introduce harmonic distortion due to the nonlinear nature of the detection process, after the signal is digitized a number of conventional filtering and signal processing techniques can be used to remedy at least a portion of such distortion.

Figure 13:
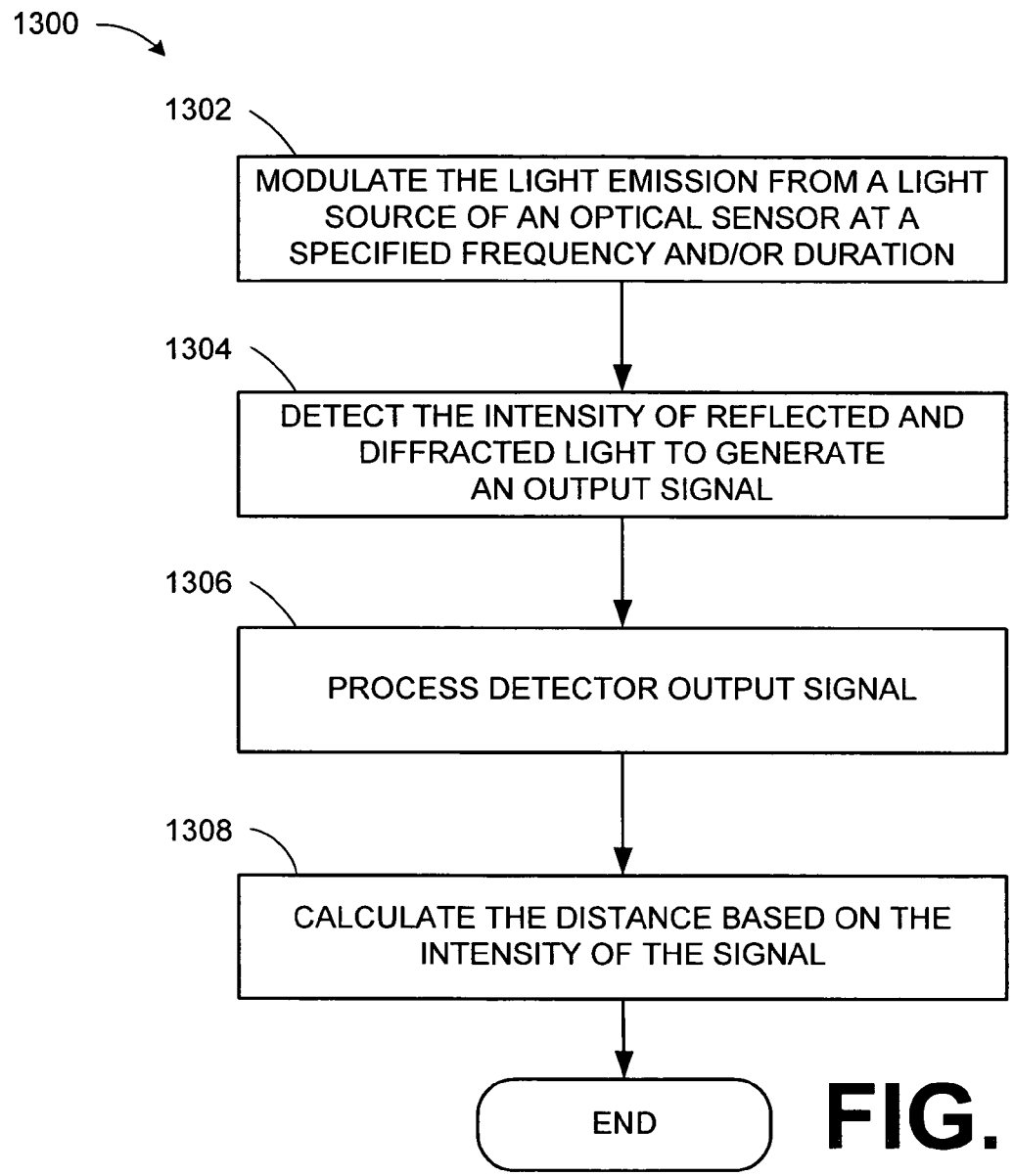
FIG. 13 depicts a flow diagram representing an embodiment of a process for low-power and/or low-noise operation of an optical sensor, such as the sensor depicted in FIG. 5.

Looking now to FIG. 13, the low-power and/or low-noise operation can also be described as a process 1300 of operating an optical sensor. According to one embodiment, at block 1302, the light emission produced by a light source in sensor 500 can be modulated (e.g. via pulse or amplitude modulation) at a specified frequency and/or duration. For example, controller 526 can cause power to be supplied to the light source (the ON state), thereby causing it to emit light for the duration of time. After the duration, the controller causes power to be removed for a second duration of time (the OFF state), which may be longer or shorter than the ON state duration. For low power operation, it is advantageous for the OFF state to be many times longer than the ON state, but this may not be necessary depending on the specific power consumption and/or other characteristics of the light source. According to some embodiments, an intermittent mechanical obstruction (e.g. opaque, semi-transparent, reflective, etc.) can provide the modulated light emission.

At block 1304 the intensity of the light reflected and diffracted from a reflector and reflective grating of the sensor 500 is detected and an output signal is provided representing the detected intensity.

At block 1306 the output signal provided at block 1104 may be processed or monitored. The monitoring and/or processing may occur continuously, or may be intermittent. For example, intermittent monitoring may be used to monitor the output at a time when the light is emitted (during the ON state of the light source). During the OFF state of the light, circuitry used to perform the step of monitoring can be powered off for further power saving. The processing may include demodulating the signal that is output from the detector.

At block 1308, the distance d can be calculated based on the output signal from the detector. This output signal used by block 1208 to determine distance d could be, for example, the low-noise signal output from the processing at block 1308 or could be the signal captured directly from the detector. The distance can be repeatedly or continuously calculated.

Figure 14:
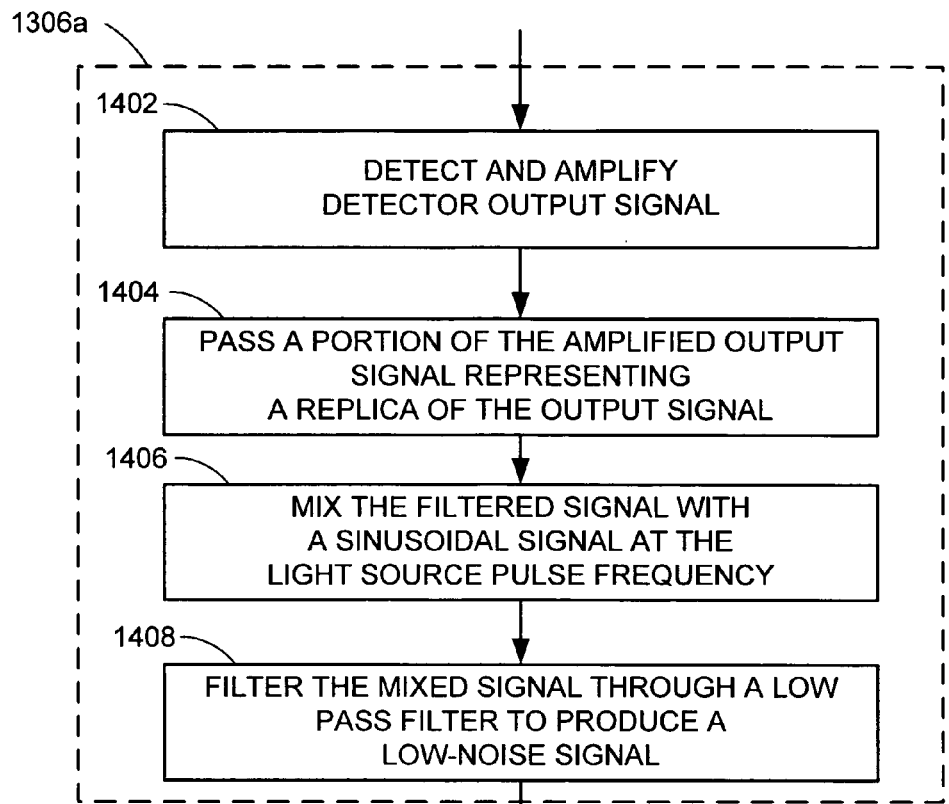
FIG. 14 depicts a flow diagram representing an embodiment of a process for processing output signals detected during the detection step of the process of FIG. 13, the process representing a coherent detection method.

FIG. 14 describes one embodiment of the signal processing that may be performed at block 1306 of process 1300 of FIG. 13. Specifically, the process describes a coherent process 1306a for demodulating signals from a detector used to detect modulated light emissions, such as those from a pulsed or amplitude modulated light source.

According to one embodiment, at block 1402, a received detector output signal is detected and/or amplified at block 1402. Specifically, a received detector output signal may be converted from a current to a representative voltage signal, and then amplified. At block 1404 the amplified signal can be filtered to pass a portion of the signal representing a replica of the output signal. The replica could be a high frequency replica, such as the replica near the desired sampling frequency. Blocks 1406 and 1408 generally comprise the process of using coherent (synchronous) detection to recover the original baseband signal. Specifically, at block 1406 the filtered signal output of block 1404 can be mixed with a sinusoidal signal produced at the modulation frequency of the light emission. At block 1408, the mixed signal can be passed through a low pass filter to produce a processed, low-noise output signal (e.g. with the effects of the low frequency noise phenomena greatly reduced).

Figure 15:
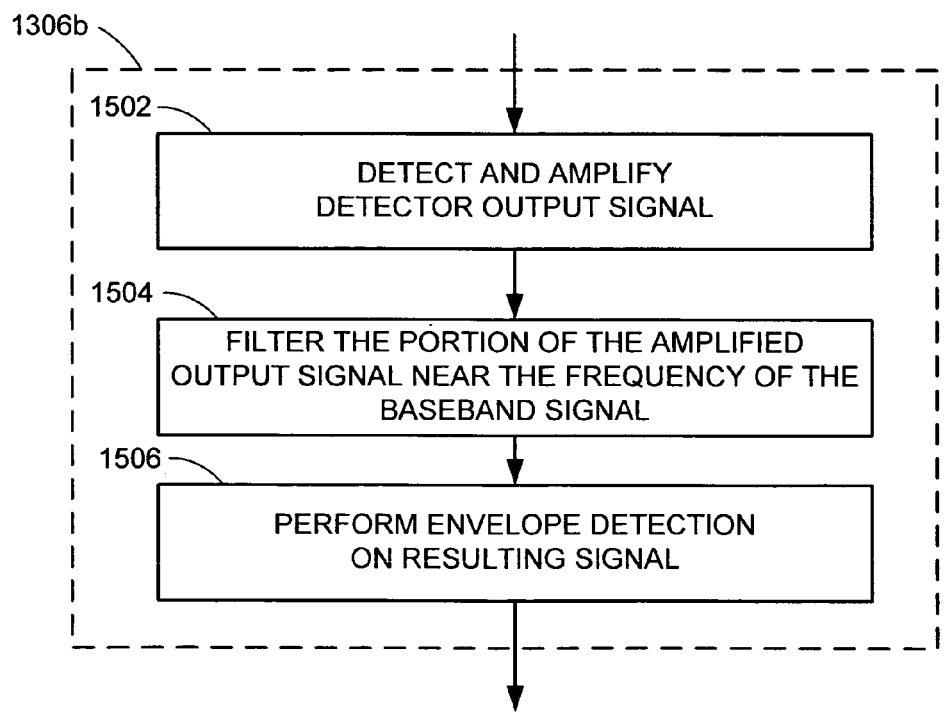
FIG. 15 depicts a flow diagram representing another embodiment of a process for processing output signals detected during the detection step of the process of FIG. 13, the process representing an AM demodulation method using envelope detection.

FIG. 15 describes another embodiment of the signal processing that may be performed at block 1306 of process 1300 of FIG. 13. Specifically, the process describes an AM demodulation process 1306b for demodulating signals from a detector of a pulsed light source. According to one embodiment, at block 1502, a received signal is detected and/or amplified at block 1502. At block 1504 the amplified signal is filtered to remove the portion of the amplified signal near the frequency of the baseband signal. That is, at block 1502, the signal is high-pass filtered to substantially remove the baseband replica of the signal along with the majority of the low frequency noise. At block 1506, envelope detection is applied to the output signal to produce a second signal at a frequency of the desired measurement signal (e.g. an audio signal, etc.). For example, the envelope detection may include passing the signal through a diode and low-pass filtering the resulting signal to detect the envelope of the incoming signal, thereby removing portions of the signal at (and above) the pulse frequency, while passing portions of the signal at the frequency of the desired measurement signal.

According to some embodiments of sensor 500, the amplitude demodulation may not be needed. That is, the output signal from detector 514 can be amplified and directly sampled and digitized by processing circuitry 524. The digitization timing can then be synchronized to the pulsing signal so that the sampling occurs at a desired instant or instants when the laser is powered. By obtaining several samples during each pulse, i.e. coherent multiple sampling, some of the noise in the signal can be averaged out.

Additionally, although the embodiments of FIGS. 9-15 may specifically refer to demodulating a light that has been modulated by pulsing the light emission on and off, it should be understood that other light emission modulation techniques may use an associated demodulation technique suited for that modulation scheme. For example, one modulation technique can include driving the light source with an electrical signal such that the emitted light intensity is periodically modulated, without necessarily powering the light source on and off. According to such an embodiment, a constant drive current can be applied to the light source (e.g. above the threshold value of a laser acting as the light source) and a sinusoidal modulation can be added at a carrier frequency. Such operation also creates a replica of the desired baseband signal at the carrier frequency, which can then be demodulated after amplification to reduce the low frequency noise at the output. Several amplitude modulation and demodulation techniques are well known and can be found in textbooks. One such textbook is "Communication Systems $2^{nd}$ edition," by Simon Haykin, John Wiley and Sons, 1983, (e.g. See, among others, chapters 3 and 8), which is hereby incorporated by reference in its entirety.

It should be emphasized that many variations and modifications may be made to the above-described embodiments. All such modifications and variations are intended to be included herein within the scope of this disclosure and protected by the following claims.

Therefore, at least the following is claimed:

1. A sensor comprising:
    a reflector positioned a distance from a reflective diffraction grating;
    a light source for providing light, a first portion of the light being reflected from the reflective diffraction grating and a second portion of the light passing through the grating to the reflector and being reflected back through the diffraction grating;
    at least a first detector configured to sense an intensity of light in an interference pattern formed by the first portion of the light reflected from the diffraction grating and the second portion of the light reflected from the reflector and configured to generate an output signal representative of the intensity of light in the interference pattern; and
    a controller configured to cause the light source to generate a sequence of discrete light pulses directed to the reflector.

2. The device of claim 1, wherein the controller is configured to cause the light source to generate a sequence of discrete light pulses by intermittently providing power to the light source.

3. The device of claim 1, further comprising:
processing circuitry for calculating a distance between the reflective diffraction grating and the reflective surface as a function of intensity of light in the interference pattern.

4. The device of claim 1, wherein the controller is configured to generate the sequence of discrete light pulses at a predetermined number of pulses per unit time.

5. The device of claim 4, wherein the number of pulses per unit time corresponds to a frequency that is at least twice the maximum frequency of a desired measurement signal.

6. The device of claim 4, further comprising: a demodulator configured to generate an electrical signal that corresponds to a continuous representation of the intensity of light in the interference pattern.

7. The device of claim 6, wherein the demodulator comprises a coherent detector comprising:
a band-pass filter for passing a portion of the output signal near the modulation frequency; and
a mixer configured to receive the portion of the output signal near the modulation frequency and a periodic signal at the modulation frequency or a harmonic of the modulation frequency to output a processed signal.

8. The device of claim 6, wherein the demodulator comprises an envelope detector.

9. The device of claim 6, wherein the demodulator comprises:
a high-pass filter for passing a portion of the output signal at a frequency higher than half of the modulation frequency;
an input for receiving a voltage bias to shift the average voltage of the signal passed through the high-pass filter to produce a shifted signal; and an envelope detector for receiving the shifted signal and producing a processed signal.

10. A method comprising:
directing a sequence of discrete light pulses to a sensor that includes a reflective surface and a diffraction grating spaced apart from the reflective surface;
sensing an intensity of a sequence of diffraction pulses wherein each of the diffraction pulses is representative of a distance between the reflective surface and the diffraction grating and generating a discrete signal representative thereof; and
generating a continuous signal representative of the distance between the reflective surface and the diffraction grating over time by filtering the discrete signal.

* * * * *